United States Patent Office 3,651,026

Patented Mar. 21, 1972

3,651,026

COPOLYMERS OF ISOPROPENYL ALKYL ETHERS AND PROCESS FOR THEIR PRODUCTION

Kurt Moser, Fribourg, Beat Hochli, Bern, and Theodor Volker and Paul Wicht, Friboug, Switzerland, assignors to Lonza Ltd., Basel, Switzerland No Drawing. Filed Jan. 19, 1970, Ser. No. 4,083
Claims priority, application Switzerland, Jan. 17, 1969, 617/69; Dec. 3, 1969, 17,985/69
Int. Cl. C08f *15/00, 15/40*
U.S. Cl. 260—78.5 R 11 Claims

ABSTRACT OF THE DISCLOSURE

Isopropenyl alkyl ethers may be copolymerized with other unsaturated monomers such as esters of unsaturated dicarboxylic acids, olefins, vinyl esters or acrylates. Polymerization is effected by known radical catalysts and may be conducted as a reaction, emulsion, suspension, solution or precipitation process.

This invention relates to copolymers of isopropenyl-alkyl ethers corresponding to the formula

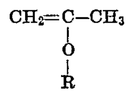

in which R represents alkyl radicals having 1 to 5 carbon atoms, with unsaturated monomers.

The properties of these new products are governed by the type of comonomers used and the quantities in which they are used, and by the polymerization process. As a rule, however, the isopropenyl alkyl ethers provide the polymers having improved resistance to alkalis. They act as inner plasticizers and in addition, the incorporation of isopropenyl alkyl ethers in the polymers provides the polymers with modification of solubility, compatibility with other components and reactivity.

Isopropenyl alkyl ethers having an alkyl radical which is linear or branched and contains 1 to 5 carbon atoms are suitable for practicing the present invention. Examples including isopropenyl methyl ether, isopropenyl ethyl ether, isopropenyl propyl ether, isopropenyl isopropyl-ether, isopropenyl butyl ether, isopropenyl sec. butyl ether and isopropenyl pentyl ether.

The softness of the polymers varies according to the quantity and the structure of the alkyl radical of the isopropenyl alkyl ether. Generally, softness increases with the number of carbon atoms in the alkyl radical (R=methyl→ethyl→propyl→butyl→pentyl)

and polymers having a branched chain alkyl radical are harder than the straight chain radical having the same number of carbon atoms. Esters and anhydrides of unsaturated dicarboxylic acid are suitable comonomers. Examples include maleic anhydride, itaconic anhydride, dimethyl maleate, diethyl maleate, dipropyl maleate, dibutyl maleate, dipentyl maleate, methylethyl maleate, methyl propyl maleate, diisopropyl maleate, disec. butyl maleate, corresponding esters of fumaric acid corresponding esters of itaconic acid and mixtures thereof. The ester radical of the unsaturated dicarboxylic acid ester is not critical to the present invention. It has been found that esters radicals of increasing carbons generally produces copolymers of increasing softness. Ester radicals of 1 to 12 carbons are preferred and may be straight or branched chain. The esters of maleic acid form with the isopropenyl alkyl ethers alternating copolymers and statistically synthesized products are obtained by polymerizing fumaric acid esters or itaconic acid esters with isopropenyl alkyl ethers.

Isopropenyl alkyl ethers can be copolymerized with olefins such as ethylene, propylene and butadiene as well as vinyl esters such as vinyl acetate or vinyl propionate. Copolymerization with acrylates and methacrylates is also possible. However, the quantity of isopropenyl alkyl ether in the copolymer is usually relatively small.

Copolymerization with acid comonomers or with compounds of the kind that are able to split off small quantities of acids during the polymerization, for example vinyl chloride, are not suitable comonomers.

The copolymers of the present invention are synthesized from at least two different monomers, one of which represents an isopropenyl alkyl ether. Different isopropenyl alkyl ethers and/or more than one different unsaturated comonomers, may be used for the preparation of terpolymers, quaterpolymers and the like.

The copolymers are prepared by known methods of radical polymerization. The polymerization may be conducted as a reaction, emulsion, suspension or solution process and precipitation polymerization is also possible.

Hydroperoxides, peroxides, persulphates, peracetates, azo and hydrazo compounds may be used as the radical catalysts. It is also possible to use accelerator systems, for example one of the redox type.

The polymers can contain 5 to 100 mole percent of the isopropenyl alkyl ethers. Polymers formed of two or more isopropenyl alkyl ethers usually contain 100 mole percent of the isopropenyl alkyl ethers but may also contain small amounts of modifying comonomers. When polymerized with esters of unsaturated dicarboxylic acids, the most rapid reaction occurs at about a 1:1 mol ratio although useful products are produced from a wide range of ratios.

The copolymers of the invention can be used for a number of purposes. They can be used as lacquers, adhesives, impregnating agents, textile auxiliaries, finishing agents, as intermediate layers and as plasticizers. It is also possible to obtain cross-linkable polymers by converting at least some of the ether groups of the copolymers into OH-groups and crosslinking these groups, for example, with diisocyanates or monohydric or polyhydric aldehydes.

EXAMPLES (1) 0.5 mol of isopropenyl methyl ether and 0.5 mol of dioctyl maleate were introduced under nitrogen into a 500 ml. flask equipped with stirring mechanism, cold trap (Dry Ice/acetone), thermometer, dropping funnel and gas-inlet pipe. Polymerization was initiated by adding 2 g. of benzoyl peroxide and 1 g. of $K_2CO_3$ and heating the reaction mixture to 60° C. The ether boiled under reflux on the cold trap at this polymerization temperature.

Polymerization was completed in 6 hours and the reaction mixture was then cooled and precipitated with methanol/carbon tetrachloride in a 10:1 ratio. The polymer was dissolved in carbon tetrachloride and then reprecipitated by the addition of a large quantity of methanol.

The colorless, sticky and highly viscous mass was separated off and dried. The yield corresponded to 95% of theoretical. Analysis of the polymer by infra-red spectroscopy revealed an alternating structure in a ratio of 1:1. Similar products were obtained by copolymerization with different quantitative proportions of isopropenyl methyl ether and dioctyl maleate, although the reaction velocity dropped rapidly as the ratio of reactants less close to the optimum 1:1 ratio.

(2) 0.5 mol of isopropenyl methyl ether and 0.5 mol of di-2-ethylhexylmaleate are polymerized according to the procedure of Example 1.

Polymerization is completed in 6 hours. The reaction mixture is cooled and precipitated with a mixture of methanol and carbon tetrachloride in a ratio by volume of 10:1. The polymer is dissolved in carbon tetrachloride and reprecipitated by the addition of a large quantity of methanol. The colorless, sticky and highly viscous mass is separated off and dried. The yield corresponds to 85% of theoretical.

Analyses of the polymer by infra-red spectroscopy reveals an alternating structure in a ratio of 1:1.

Similar products are obtained by copolymerizations with different quantities of isopropenyl methyl ether and di-2-ethylhexyl maleate, although there is a marked drop in the reaction velocity.

These copolymers are useful as adhesives or protective colloids.

(3) 0.5 mol of dimethyl maleate, 150 ml. of petrol (fraction 50–70° C.), 2 g. of azoisobutyronitrile and 0.3 g. of $K_2CO_3$ were introduced into the apparatus described in Example 1. The mixture was then heated to 50° C. and 0.5 mol of isopropenyl methyl ether slowly added dropwise over a period of 15 minutes. Polymerization was continued for 3 hours, after which 2 g. of lauroyl peroxide were added. The polymer was precipitated during the reaction in the form of a viscous glue-like mass. After 10 hours, the product was cooled to room temperature and the supernatant petrol solution separated off. The precipitate was dissolved in a very small quantity of chloroform and reprecipitated from petroleum ether, separated off and dried. The fine, white non-tacky powder had a high static charge and is useful as a thickener or protective colloid.

(4) 2 mols of isopropenyl ethyl ether, 0.5 mol of dibutylfumarate, 2 g. of benzoyl peroxide and 0.3 g. of potassium carbonate are introduced under nitrogen into the apparatus described in Example 1. After heating to 60° C., polymerization continues vigorously for 10 hours following a brief induction period.

The readily volatile constituents are distilled off in vacuo, the residue is dissolved in a little acetone and precipitated with 10% NaCl solution. The precipitated product is separated off, washed and dried. The yield corresponds to 95% of theoretical. It is possible to produce relatively soft, firmly adhering, colorless, clear films from this polymer.

Unlike the copolymers with maleic acid derivatives, the fumarates give statistically synthesized products as shown by infra-red spectroscopy. Accordingly, the composition of the polymers is governed to a large extent by the initial composition of the two comonomers. The reaction velocity is seen to fall appreciably with decreasing isopropenyl ether concentration.

(5) 0.5 mol of isopropenyl methyl ether, 0.5 mol of isopropenyl ethyl ether, 1 mol of diethyl maleate, 2 g. of benzoyl peroxide and 0.3 g. of potassium carbonate were introduced under nitrogen into the apparatus described in Example 1.

Polymerization was completed after 10 hours at 60° C.; the reaction product dissolved in a little methanol and then precipitated with a 10% aqueous NaCl-solution.

Isolation by reprecipitation followed by drying leaves a white to pale yellow was obtained by reprecipitation.

(6) The following components were introduced into a double-stainless jacketed V2A-steel autoclave equipped with stirring mechanism, thermometer and reflux condenser:

| | |
|---|---|
| Water, g. | 600 |
| Sodium bicarbonate, g. | 1 |
| Disodium phosphate | (1) |
| $Na_2HOP_4.12H_2O$, g. | 3 |
| Potassium persulphate, g. [2] | 3 |
| Hydroxyethyl cellulose, g. [3] | 12 |

[1] As buffer.
[2] As catalyst.
[3] As protective colloid.

The autoclave was flushed with nitrogen and heated while stirring to 70° C. A 60 g. charge of a mixture containing 200 g. of vinyl acetate monomer, 200 g. of dibutyl maleate, 200 g. of isopropenyl methyl ether and 9 g. of a nonylphenol ethyl oxide condensate was then added.

Refluxing ceased after 15 to 20 minutes, when the first portion is polymerized. The remainder of the mixture of comonomers was then added continuously over a period of 4 to 5 hours. The temperature was maintained at 70 to 75° C. for another 2 to 3 hours. After the residual monomers had been removed with a stream of nitrogen, the product was cooled and a dispersion with the following characteristic properties was observed:

Solids content: 47%
Viscosity: 50 poises
Particle size: 1–4 microns

After drying, the dispersion gave a plastic film having outstanding transparency which is suitable as an adhesive, as a flexible coating or in dispersion dyes.

(7) 18 g. of Gohsenol GM 14, a polyvinyl alcohol with a saponification number of 120, viscosity of a 4% solution 25 cp. manufactured by Nippon Synthetic Chemical, 1.2 g. of sodium bicarbonate, 3 g. of sodium phosphate, 3 g. of potassium persulphate and 6 g. of Antarox, nonylphenoxypoly (ethyleneoxy) ethanol manufactured by General Aniline & Film Corporation were dissolved in 600 g. of water in a flask equipped with stirring mechanism, reflux condenser, thermometer, dropping funnel and gas inlet pipe. The flask was then flushed with nitrogen, after which a 10% charge of a mixture of 550 g. of vinyl acetate and 50 g. of isopropenyl methyl ether were added, followed by heating to 70° C. After polymerization had been initiated as evidenced by no further distillation of the monomers under reflux, the rest of the monomers were added dropwise over a period of two hours. Polymerization was allowed to continue for another hour, giving a dispersion with the following properties:

Solids content: 50%
pH: 4.5
Viscosity: 50 p. (as measured in a Brookfield Viscosimeter at 10 r.p.m.)

Compared with the vinyl acetate polymer, this dispersion demonstrated superior adhesion to wood and paper.

(8) 100 g. of maleic acid anhydride was dissolved in 350 g. of dry benzene in a 1 liter Erlenmeyer flask. The solution was then filtered to remove the insoluble residue. The filtrate was then introduced into a reaction flask followed by the addition of 1 g. of benzoyl peroxide and 2 g. of azoisobutyrodinitrile. The flask was flushed with nitrogen and heated to 50° C. with moderate stirring. 100 g. of isopropenylmethyl ether were added over a period of from 1.5 to 2 hours. The temperature of from 50 to 55° C. was maintained for 8 to 10 hours with continuous stirring. The polymer precipitated on the bottom of the flask; was removed by decantation; dissolved in 150 g. of acetone and then reprecipitated with 600 g. of methanol while stirring vigorously. This procedure was repeated twice in order to remove residual ether monomer and residual maleic acid anhydride. The product was then dried for a few hours in a vacuum drying cabinet at a temperature of 50° C. The product weighed (90 g.); was an almost white powder and was soluble in water in the presence of alkali or ammonia. In this form, the product is useful as a colloid, a suspending agent for pigments or as a conditioning agent for aqueous polymer dispersions.

We claim:

1. A composition comprising copolymers prepared by polymerizing an admixture consisting essentially of:

(a) at least one isopropenyl alkyl ether corresponding to the formula:

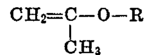

wherein R is a linear or branched alkyl radical of 1 to 5 carbon atoms; and (b) at least one unsaturated comonomer selected from the group consisting of esters of maleic acid, ester of fumaric acid, esters of itaconic acid, vinyl acetate, vinyl propionate, ethylene, propylene, butadiene, maleic anhydride, itaconic anhydride and mixtures thereof.

2. A composition according to claim 1 wherein (a) is comprised of a monomeric mixture of at least two isopropenyl alkyl ethers.

3. A composition according to claim 1 wherein said unsaturated comonomer (b) is an ester of maleic acid selected from the group consisting of dimethyl maleate, diethyl maleate, dipropyl maleate, diisopropyl maleate, dibutyl maleate, disec. butyl maleate, dipentyl maleate, di-(2-ethylhexyl) maleate and dioctyl maleate, and wherein said admixture contains about 50 mol percent of said isopropenyl alkyl ether (a).

4. A composition according to claim 1 wherein said unsaturated comonomer (b) is an ester of fumaric acid selected from the group consisting of dimethyl fumarate, diethyl fumarate, dipropyl fumarate, diisopropyl fumarate, dibutyl fumarate, disec. butyl fumarate, dipentyl fumarate, di-(2-ethylhexyl) fumarate and dioctyl fumarate and wherein said admixture contains about 50 mol percent of said isopropyl alkyl ether (a).

5. A composition according to claim 1 wherein said unsaturated comonomer (b) is an ester of itaconic acid selected from the group consisting of dimethyl itaconate, diethyl itaconate, dipropyl itaconate, diisopropyl itaconate, dibutyl itaconate, disec. butyl itaconate, dipentyl itaconate, di(2-ethylhexyl) itaconate and dioctyl itaconate, and wherein said admixture contains about 50 mol percent of said isopropenyl alkyl ether (a).

6. A composition according to claim 1 wherein said unsaturated comonomer (b) is selected from the group consisting of maleic anhydride, and itaconic anhydride, and wherein said admixture contains about 50 mol percent of said isopropenyl alkyl ether (a).

7. A composition according to claim 1 wherein said unsaturated comonomer (b) is selected from the group consisting of vinyl acetate, vinyl propanate, and mixtures thereof, and wherein said admixture contains about 50 mol percent of said isopropenyl alkyl ether (a).

8. A composition according to claim 1 wherein said unsaturated comonomer (b) is selected from the group consisting of ethylene, propylene, butadiene and mixtures thereof, and wherein said admixture contains about 50 mol percent isopropenyl alkyl ether (a).

9. A composition according to claim 1 wherein said isopropenyl alkyl ether (a) is isopropenyl methyl ether.

10. A composition according to claim 1 wherein said isopropenyl alkyl ether (a) is isopropenyl ethyl ether.

11. A composition according to claim 1 wherein said isopropenyl alkyl ether (a) is selected from the group consisting of isopropenyl ethyl ether, isopropenyl methyl ether, isopropenyl isopropyl ethyl ether, isopropenyl propyl ether, isopropenyl sec. butyl ethyl ether, isopropenyl butyl ether, and isopropenyl pentyl ether.

References Cited

UNITED STATES PATENTS 2,994,681 8/1961 Hammon et al. ______ 260—41.5
2,751,372 6/1956 Taylor et al. ________ 260—78.5

FOREIGN PATENTS 453,476 12/1948 Canada ____________ 260—78.5
494,415 7/1953 Canada ____________ 260—78.5

JOSEPH L. SCHOFER, Primary Examiner

J. KIGHT III, Assistant Examiner

U.S. Cl. X.R.

260—80.3 E, 80.76, 80.81, 82.1, 85.7, 88.1 PE